(12) United States Patent
Fosse

(10) Patent No.: US 6,170,874 B1
(45) Date of Patent: Jan. 9, 2001

(54) VARIABLE ENERGY-ABSORBING STEERING COLUMN

(75) Inventor: Tore Fosse, Göteborg (SE)

(73) Assignee: AB Volvo, Göteborg (SE)

(*) Notice: Under 35 U.S.C. 154(b), the term of this patent shall be extended for 0 days.

(21) Appl. No.: 09/308,432

(22) PCT Filed: Oct. 30, 1997

(86) PCT No.: PCT/SE97/01813

§ 371 Date: May 19, 1999

§ 102(e) Date: May 19, 1999

(87) PCT Pub. No.: WO98/22325

PCT Pub. Date: May 28, 1998

(30) Foreign Application Priority Data

Nov. 21, 1996 (SE) .................................................. 9604257

(51) Int. Cl.[7] .................................................. B62D 1/19
(52) U.S. Cl. .......................... 280/777; 180/268; 74/492
(58) Field of Search .................. 280/777; 180/268; 74/492; 188/371

(56) References Cited

U.S. PATENT DOCUMENTS

| | | | |
|---|---|---|---|
| 4,886,295 | * 12/1989 | Browne | 280/777 |
| 4,978,138 | 12/1990 | Hikone et al. | 280/777 |
| 5,503,431 | * 4/1996 | Yamamoto | 280/777 |

* cited by examiner

Primary Examiner—Peter C. English
(74) Attorney, Agent, or Firm—Royston, Rayzor, Vickery, Novak & Druce, L.L.P.

(57) ABSTRACT

Apparatus and methods for protecting the occupant of a motor vehicle including a seat belt for restraining the occupant and a stress-bearing structure are disclosed. The apparatus includes a steering shaft, a steering column supporting the steering shaft, the steering column displaceably mounted with respect to the stress-bearing structure, a first energy absorber for absorbing energy upon displacement of the steering column with respect to the stress-bearing structure by the occupant, a sensor for detecting a condition in which the occupant is restrained by the seat belt, a second energy absorber for absorbing energy upon displacement of the steering column with respect to the stress-bearing structure by the occupant, and a lock for permitting absorption of energy by the second energy-absorbing unit by displacement of the steering column with respect to the stress-bearing structure by the occupant when the condition is detected by the sensor.

13 Claims, 3 Drawing Sheets

VARIABLE ENERGY-ABSORBING STEERING COLUMN

FIELD OF THE INVENTION

The present invention relates to a device for protection of occupants in a vehicle. More particularly, the present invention relates to such devices which are intended to be used in energy absorbing steering systems for motor vehicles. The invention also relates to a method for occupant protection in vehicles.

BACKGROUND OF THE INVENTION

In motor vehicles, it is a general goal to reduce the effects of a collision on the occupants of the vehicle as much as possible. In today's cars, three-point seatbelts are therefore normally employed to restrain the occupants of the vehicle. In a known manner, the seatbelts offer good protection and increased safety for the occupants should a collision take place.

Nowadays, there is also a desire to provide steering systems in vehicles which are energy-absorbing. The reason for this desire, which is dictated by legislation in certain countries, is that there is a need to offer some degree of protection to a driver who is not wearing a seatbelt when he is thrown towards the steering wheel in a collision.

It is previously known to design the steering system of the vehicle so that it absorbs energy when the driver of the car is thrown forwards and impacts the steering wheel during a collision. This can be achieved, for example, by designing the steering wheel with deformable and flexible spokes. This can also be achieved by arranging the steering shaft of the vehicle in a particularly designed energy absorbing steering column which is attached to the stress-bearing structure of the vehicle. In the event of a collision, when the steering wheel, and thus also the steering column, are influenced by a very large force as a result of the occupant being thrown forwards, this force will be transmitted from the steering wheel to the steering column. In this manner, the steering column will be displaced a certain distance relative to the vehicle structure. During this displacement, energy will be absorbed which, as a consequence, reduces the effects on the driver during the collision sequence.

Apparatus is disclosed in U.S. Pat. No. 4,978,138 for energy absorption in a steering system for vehicles. This apparatus is based on the principle that if the driver is not wearing his seatbelt, the steering system will absorb energy when the driver is thrown against the steering wheel during a possible collision. To achieve this, the arrangement includes a particular deformable and energy-absorbing bracket which is connected to the steering column. In order to determine whether the driver is wearing his seatbelt, a sensor is arranged on the seatbelt lock. This known arrangement also includes means for protecting the driver's knees, which means is activated irrespective of whether the driver is wearing his seatbelt or not. If the driver is wearing his seatbelt, the force from the knees will be absorbed by the knee protector as the steering wheel is displaced, whereby it is possible to prevent the upper body and head of the driver from impacting the steering wheel. The arrangement according to this patent, however, suffers from the disadvantage that the circumstances in which the driver can in fact impact the steering wheel during a collision even if he is wearing his seatbelt are not taken into account. This can occur, for example, when the driver has his seat in a well forward position or when the seatbelt is unusually slack.

SUMMARY OF THE INVENTION

In accordance with the present invention, these and other objects have now been realized by the invention of apparatus for protecting the occupant of a motor vehicle including a seatbelt for restraining the occupant and a stress-bearing structure, the apparatus comprising a steering shaft, a steering column supporting the steering shaft, the steering column displaceably mounted with respect to the stress-bearing structure, a first energy-absorbing unit for absorbing energy upon displacement of the steering column with respect to the stress-bearing structure by the occupant, a sensor for detecting a condition in which the occupant is restrained by the seatbelt, a second energy-absorbing unit for absorbing energy upon displacement of the steering column with respect to the stress-bearing structure by the occupant, and a locking member for permitting the absorption of energy by the second energy-absorbing unit by displacement of the steering column with respect to the stress-bearing structure by the occupant when the condition is detected by the sensor.

In accordance with one embodiment of the apparatus of the present invention, the locking member prevents absorption of energy by the second energy-absorbing unit by displacement of the steering column with respect to the stress-bearing structure by the occupant when the condition is not detected by the sensor.

In accordance with one embodiment of the apparatus of the present invention, the energy capable of being absorbed by the first energy-absorbing unit is less than the energy capable of being absorbed by the second energy-absorbing unit.

In accordance with another embodiment of the apparatus of the present invention, the second energy-absorbing unit comprises a first carriage fixedly mounted with respect to the steering column, a second carriage fixedly mounted with respect to the stress-bearing structure, the first and second carriages being displaceably mounted with respect to each other, and a second energy-absorbing element for absorption of the energy upon displacement of the first carriage with respect to the second carriage. In a preferred embodiment, the locking member comprises an electrically operated solenoid. Preferably, the electrically operated solenoid is mounted on one of the first and second carriages, the electrically operated solenoid including a piston, and wherein the other of the first and second carriages includes a recess cooperating with the piston. In accordance with a preferred embodiment, the electrically operated solenoid is mounted on the second carriage and the other of the first and second carriages comprises the first carriage.

In accordance with another embodiment of the apparatus of the present invention, the second energy-absorbing element comprises a strip including a first end and a second end, the first end of the strip being affixed to the first carriage and the second end of the strip being affixed to the second carriage.

In accordance with the present invention, these objects have also been overcome by the invention of a method for protecting the occupant of a motor vehicle including a seatbelt for restraining the occupant, a stress-bearing structure, a steering shaft, and a steering column supporting the steering shaft, the steering column being displaceably mounted with respect to the stress-bearing structure, the method comprising detecting a condition in which the occupant is restrained by the seatbelt, absorbing energy through a first energy-absorbing unit upon displacement of the steering column with respect to the stress-bearing structure by the occupant, and absorbing energy through a second energy-absorbing unit upon displacement of the steering column with respect to the stress-bearing structure when the condition is detected. In accordance with one embodiment, the method includes preventing absorption of the energy by the second energy-absorbing unit by displacement of the steering column with respect to the stress-bearing structure by the occupant when the condition is not detected.

In accordance with one embodiment of the method of the present invention, the energy capable of being absorbed by the first energy-absorbing unit is less than the energy capable of being absorbed by the second energy-absorbing unit. Preferably, the second energy-absorbing unit includes a locking member having a first actuated condition for preventing the absorption of energy by the second energy-absorbing unit, and a second non-actuated condition for permitting the absorption of energy by the second energy-absorbing unit, whereby the locking member is actuated when the condition is detected, the method including feeding a current to an electrically operated solenoid for actuating the locking member.

In accordance with another embodiment of the method of the present invention, a second carriage is affixed to the stress-bearing structure, and a first carriage is affixed to the steering column, the first and second carriages being displaceably affixed to each other, the absorbing of the energy through the second energy-absorbing unit comprising displacement of the first carriage with respect to the second carriage.

A primary object of the present invention is thus to solve the above-mentioned problems and to provide an improved device for energy absorption in a steering system for a motor vehicle which primarily provides optimal energy absorption irrespective of whether the seatbelt is being used by the driver.

The present invention is intended for use in vehicles having a steering column which supports a steering shaft and in which a force is normally exerted by the occupant against the steering column during a collision, whereby the steering column can thus be displaced with respect to the stress-bearing structure of the vehicle. The present invention comprises a first energy-absorbing unit for absorbing energy during such displacement. Furthermore, the present invention includes a sensor for detecting a condition which determines that the occupant is wearing his seatbelt. This invention is based on the principle that a second energy absorbing unit is arranged between the steering column and the vehicle's stress-bearing structure, and that the sensor is connected to a lock arrangement which, when said condition is detected, permits displacement of the second energy-absorbing unit with respect to the stress-bearing structure. During such displacement, energy is absorbed. In this manner, the energy-absorbing capability of the steering system can be varied depending on whether or not the driver is wearing his seatbelt. This provides increased safety for the driver in the event of a collision.

In a preferred embodiment, the second energy absorbing unit comprises a first carriage which is connected to the steering column and a second carriage which is connected to the stress-bearing structure of the vehicle. It further includes an energy-absorbing element for absorbing energy during displacement of the carriages with respect to each other. These two carriages can adopt two different conditions depending on whether or not the driver is wearing his seatbelt. Either the carriages are locked together with respect to each other, or they are disconnected so that they can be displaced relative to each other. In order to achieve this, the present invention comprises the above-mentioned lock arrangement which is controlled by a sensor which detects whether the seatbelt is being used. In this manner, a certain predetermined energy absorption in the steering column is attained when the driver is wearing his seatbelt, and another energy absorption is obtained when the driver is not wearing his seatbelt.

BRIEF DESCRIPTION OF THE DRAWINGS

The present invention will be described in the following detailed description in greater detail, with reference to a preferred embodiment and the attached drawings, in which.

DETAILED DESCRIPTION OF PREFERRED EMBODIMENTS

Figure 1:
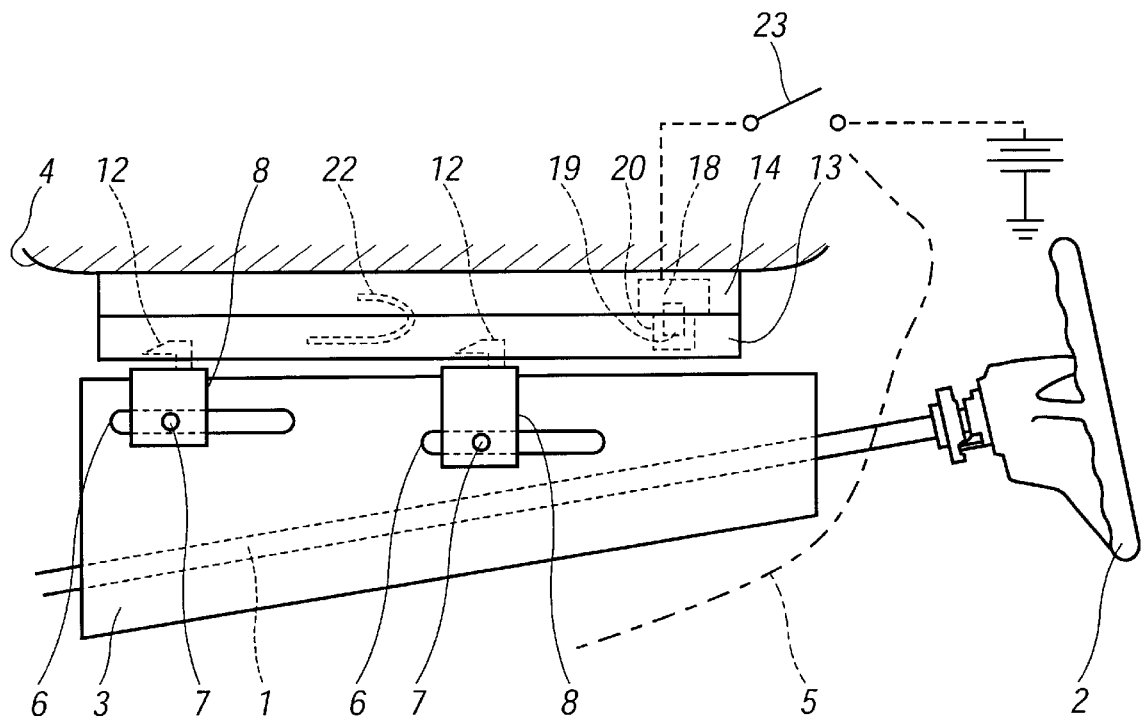
FIG. 1 is a side, elevational, partly schematic view of a preferred embodiment of the present invention.

Referring to the figures, in which like reference numerals refer to like elements thereof, FIG. 1 shows a somewhat simplified elevational view of apparatus according to the present invention. The apparatus is primarily intended to be employed in motor vehicles, for example in a car. The vehicle is, in a known manner, provided with a steering shaft 1 which, at its upper end, supports a steering wheel 2. The lower end portion of the steering shaft 1 is connected to a steering mechanism (not shown) which, in a known manner, is intended for steering the wheels of the vehicle.

The steering shaft 1 is supported in a steering column 3 in a manner which is already known and which therefore will not be described in detail. For example, the steering column 3 can comprise means (not shown) for adjusting the rake and reach of the steering shaft 1. Furthermore, the steering column 3 is substantially box-shaped with a substantially horizontal upper side and a somewhat angled lower side. The steering column 3 is arranged underneath the dashboard 4 of the vehicle, the contours of which are indicated by a broken line 5. In addition, the shape and form of the steering column 3 are adapted, to the type of vehicle in which the present invention is employed.

The steering column 3 is designed so as to be able to absorb energy when influenced by the force which arises should the driver impact the steering wheel 2 during, for example, a collision. To this end, the sides of the steering column 3 are provided with elongated slots 6, which are preferably four in number, whereby two of the slots are arranged on the side of the steering column 3 which is visible in FIG. 1 (and whereby the remaining slots are arranged on the opposite side of the steering column 3 and thus cannot be seen in FIG. 1). Two rods 7 extend through the steering column 3 and the slots 6, which rods extend substantially perpendicular to the extension of the steering shaft 1. The rods 7 are rotatably supported in brackets 8, which are fixedly arranged on the outside of the steering column 3.

Figure 2:
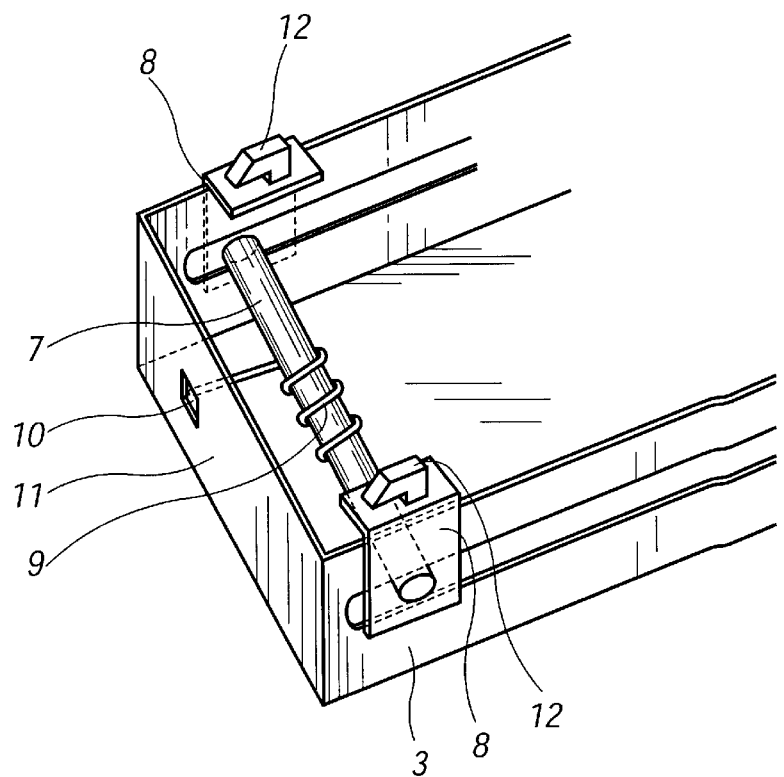
FIG. 2 is a top, perspective view of a portion of a first energy-absorbing unit according to the embodiment shown in FIG. 1.

With reference to FIG. 2, which is a perspective view from the front of the front end region of the steering column 3, including one of the rods 7, it is apparent that the rod 7 is provided with an energy-absorbing element which is preferably in the form of a wire 9 which can be unwound.

One end of the wire 9 is fixed at an attachment point 10 on the short side 11 of the steering column 3, while the rest of the wire 9 is wound about the rod 7 and is preferably also affixed thereto. The wire 9 is preferably a thick steel wire which is rolled out or unwound in the event that the steering column 3 attempts to be displaced in relation to the rod 7. During such a displacement of the steering column 3, the wire 9 offers a certain resistance, the amount of which is determined by the dimensions and material of the wire 9, as well as its winding diameter. In this manner, the steering column 3 can absorb energy should a driver impact the steering wheel during a possible collision.

Figure 3:
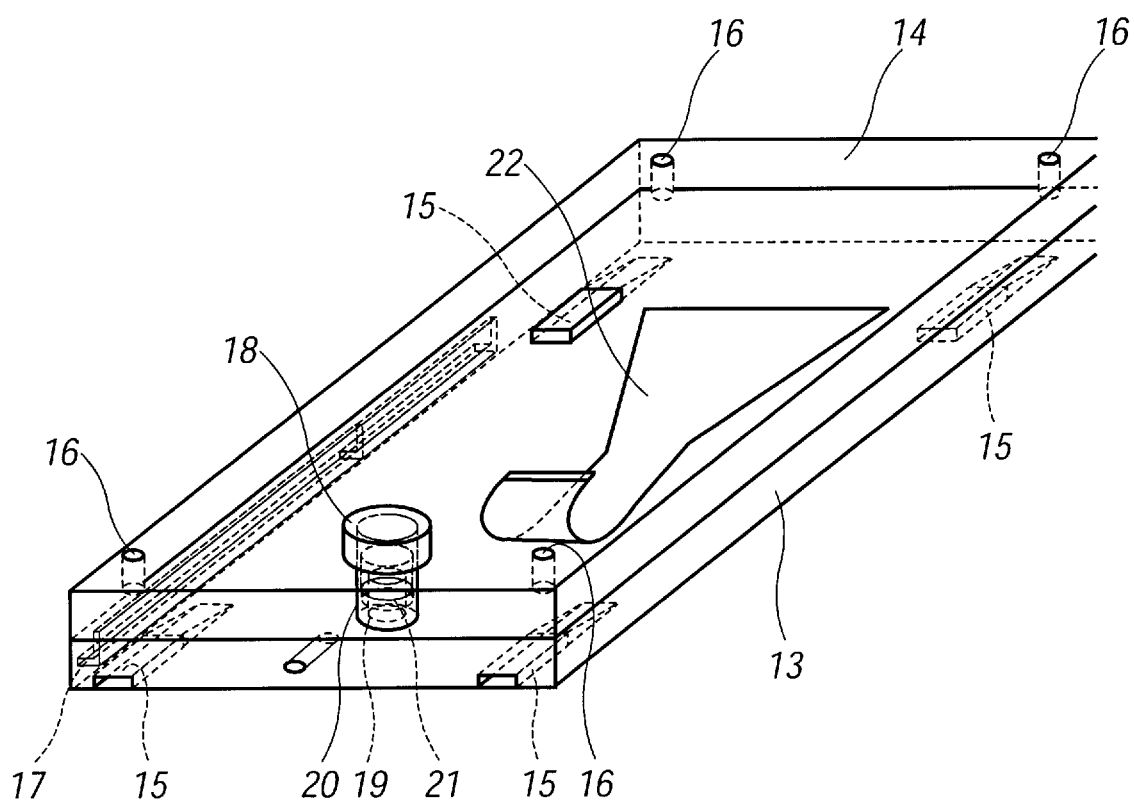
FIG. 3 is a front, perspective view of a second energy-absorbing unit according to the present invention.

Each bracket 8 is provided with an attachment element in the form of a hook 12. Referring once again to FIG. 1, it is apparent that each hook 12 has a region with a wedge-shaped cross section. Furthermore, each hook 12 is intended to be mounted in a corresponding wedge-shaped groove (not apparent from FIG. 1) in a first lower carriage 13 which constitutes a part of a further energy-absorbing arrangement. This carriage 13 is, in turn, displaceably arranged on the lower side of a second upper carriage 14 which is fixedly arranged on the lower side of the dashboard 4. The arrangement with the two carriages, 13 and 14, will now be described in detail with reference to FIG. 3.

The lower carriage 13 is provided with a plurality of, preferably four, grooves or recesses 15 which serve as attachments for the above-mentioned hooks 12 (compare with FIGS. 1 and 2) which are arranged on the brackets 8 on the steering column 3. When the complete device is in a mounted condition, the steering column 3 is thus fixedly arranged in relation to the lower carriage 13 by means of the brackets 8 and the hooks 12. The upper carriage 14 is provided with holes or corresponding attachment means 16 intended for mounting to the dashboard which, in turn, is fixedly attached to the stress-bearing structure of the vehicle.

The lower carriage 13 is arranged with respect to the upper carriage 14 in such a manner that it can slide in the direction of its longitudinal extension which corresponds substantially to the longitudinal direction of the vehicle. For this purpose, the upper carriage 14 is provided with a suspension arrangement which is shown schematically in FIG. 3 in the form of a longitudinally extending guide 17. Of course, more than one such guide 17 can be employed. Alternatively, the carriages can be suspended in a frame or a similar component so that the lower carriage can be displaced in its longitudinal direction. This displacement of the lower carriage 13 with respect to the upper carriage 14 occurs when certain predetermined operational conditions are present in accordance with that which is described in detail below.

An electrically-actuated solenoid 18 is arranged on the upper carriage 14. The solenoid 18 is shown schematically in FIG. 3 and, in a known manner, comprises a displaceable piston 19, the position of which is determined by providing a current from a source of power (not shown). In its non-influenced state, the piston 19 engages a corresponding hole or recess 20 in the lower carriage 13. For this purpose, the piston is urged in the direction of the hole 20 by a spring 21.

With the help of the solenoid 18, the movement of the carriages, 13 and 14, with respect to each other can be controlled. In the condition where no current is connected to the solenoid 18, the piston 19 engages the hole 20 due to the influence of the spring 21. This implies that the carriages, 13 and 14, are locked with respect to each other. When a current is applied to the solenoid 18, the piston 19 is withdrawn, whereby the force from the spring 21 is overcome. In this manner, the piston 19 is pulled out of engagement of the hole 20, which now permits the lower carriage 13 to be displaced substantially horizontally with respect to the upper carriage 14. In this condition, a second energy-absorbing element is also employed, this being in the form of a tongue or a strip 22 of metal. This strip 22, which is also shown in FIG. 1, is attached at one end to the lower carriage 13 and at the other end to the upper carriage 14. The strip 22 is somewhat curved and provides a predefined resistance, i.e. energy absorption, during displacement of the lower carriage 13 with respect to the upper carriage 14.

The solenoid 18 is connected to a sensor arrangement, which is adapted to detect a condition which indicates whether or not the driver of the vehicle is wearing his seatbelt. For this purpose, the locking arrangement of the seatbelt is preferably provided with a switch 23 which is closed when the buckle of the seatbelt is locked. This indicates that the driver is wearing his seatbelt. The switch 23 is also connected to a source of energy which, in turn, is adapted to energize the solenoid 18 in the case where the seatbelt is being used. When the solenoid 18 is activated, its piston 19 is retracted from the hole 20, which permits the above-mentioned displacement of the lower carriage 13.

Figure 4:
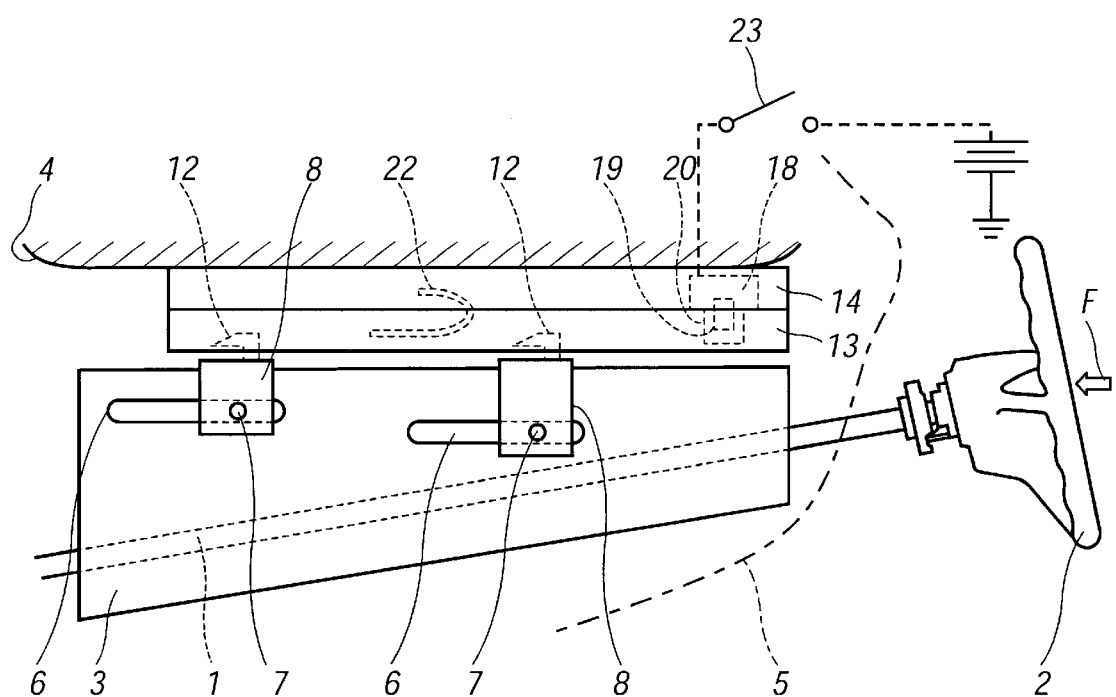
FIG. 4 is a side, elevational, schematic view of the present invention in a first condition.

The present invention will now be described with reference to FIGS. 4 and 5 which, in a somewhat simplified manner, show its operation during a collision in which the steering wheel 2, and thus also the steering column 3, are influenced by a force F in a direction to the left in the drawings. FIG. 4 shows the condition which prevails when the seatbelt is not worn by the driver. This implies that the solenoid 18 is in its non-active position, whereby the piston 19 extends down into the hole 20 in the lower carriage 13. Since the lower carriage 13 cannot then be displaced with respect to the upper carriage 14, the steering column 3 will instead be displaced with respect to the lower carriage 13, whereby the steering column 3 is displaced forwardly while the rods 7 are guided along the slots 6. During this sequence of events, the energy absorbing wires 9 become unwound (compare with FIG. 2), which implies that the steering column 3 absorbs energy. This reduces the influences on the driver during an accident.

Figure 5:
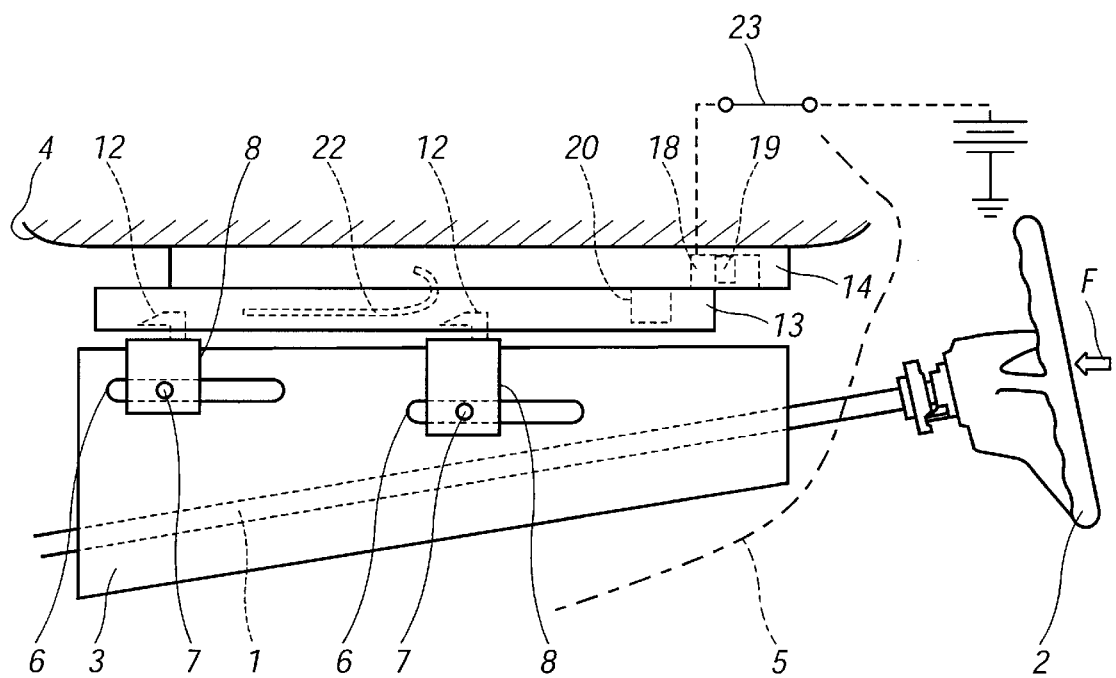
FIG. 5 is a side, elevational, schematic view of the present invention in a second condition.

FIG. 5 shows the condition which prevails when the driver is wearing his seatbelt. In this situation, the solenoid 18 is actuated with the help of the above-mentioned sensor arrangement. This implies that the piston 19 is retracted so that it no longer projects into the hole 20 in the lower carriage 13. In this manner, the lower carriage 13 becomes displaceable with respect to the upper carriage 14. When the driver of the vehicle impacts the steering wheel 2, the force F which thus arises will be transmitted to the lower carriage 13 (through the steering column 3), whereby the lower carriage 13 is displaced to the left in the drawing. During this sequence of events, energy will be absorbed by the energy-absorbing strip 22 which, during displacement of the lower carriage 13, is extended and stretched out.

Preferably, the energy absorption capabilities of the wires 9 and the strip 22 are such that the strip 22 is more flexible than the wire 9. In the case when the driver is wearing his seatbelt, this implies that the steering column 3 is not displaced with respect to the lower carriage 13 under the influence of the force F. This also implies that the system offers a lower resistance when a driver who is wearing his seatbelt impacts the steering wheel. This is because an amount of energy absorption during a collision is absorbed by the seatbelt itself.

By means of the present invention, two different types of energy absorption of the steering system are obtained. This is obtained automatically depending on whether or not the driver is wearing his seatbelt.

The present invention is not restricted to the above-described embodiments, but can be varied within the scope of the appended claims. For example, the size and choice of material for the steel wire 9 and the strip 22 can be varied depending on the desired energy absorption capability of the steering system. The energy absorption of the wire 9 and strip 22 is thus selected such that suitable energy absorption is obtained for the driver when driving without and with his seatbelt, respectively. The strip 22 can be made more flexible than the wire 9, or vice versa. Furthermore, the wire 9 and the strip 22 can be replaced by other types of energy absorbing elements, for example ribbons, springs, material weakenings, etc. Instead of the steel wire 9 which is rolled about the rod 7, other types of energy-absorbing elements can for example be arranged between the steering column 3 and respective brackets 8 for damping the force during displacement of the steering column 3.

The two carriages can be locked with respect to each other either when the driver is wearing his seatbelt or when the driver is not wearing his seatbelt.

In accordance with one conceivable variation of the present invention, the function of the solenoid can also be controlled so that it is dependent on a weight sensor in the driver's seat which detects whether or not the occupant weighs more than a certain predetermined amount.

The two carriages, 13 and 14, can be designed in different ways, for example in the form of box- or cassette-like elements which can be displaced substantially parallel with respect to each other. Nevertheless, it is a principle under-lining the present invention that the two can be locked together with respect to each other depending on whether or not the driver is wearing his seatbelt.

The attachment of the steering column 3 can be achieved in various ways. For example, screws or similar attachment means can be used instead of the hooks 12. Furthermore, the carriages, 13 and 14, can be attached to the stress-bearing structure of the vehicle in a manner other than to the underside of the dashboard 4. In addition, the slots 6 which are in the steering column 3 can for example be two in number instead of four as shown in the drawings.

The solenoid can be arranged such that its piston projects downwardly (see for example FIG. 4), upwardly, or to the side. For example, in accordance with a further variation, the solenoid can be arranged in the lower carriage, whereby its piston projects upwardly into a hole in the upper carriage.

Furthermore, more than one solenoid can be used as the locking means for the carriages.

The two carriages can be arranged as an upper and a lower carriage or, alternatively, as two carriages which are at least partially arranged side by side.

According to an alternative embodiment, the lower carriage 13 can be arranged directly against the underside of the dashboard. In such an arrangement, the solenoid and the one end of the strip 22 are also arranged on the underside of the dashboard.

Finally, it is to be appreciated that the invention can be employed in different types of vehicle, for example cars, trucks or buses.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for protecting the occupant of a motor vehicle including a seatbelt for restraining said occupant and a stress-bearing structure, said apparatus comprising a steering shaft, a steering column supporting said steering shaft, said steering column displaceably mounted with respect to said stress-bearing structure, a first energy-absorbing unit for absorbing energy upon displacement of said steering column with respect to said stress-bearing structure by said occupant, a sensor for detecting a condition in which said occupant is restrained by said seatbelt, a second energy-absorbing unit for absorbing energy upon displacement of said steering column with respect to said stress-bearing structure by said occupant, and a locking member for permitting said absorption of energy by said second energy-absorbing unit by displacement of said steering column with respect to said stress-bearing structure by said occupant when said condition is detected by said sensor.

2. The apparatus of claim 1 wherein said locking member prevents absorption of energy by said second energy-absorbing unit by displacement of said steering column with respect to said stress-bearing structure by said occupant when said condition is not detected by said sensor.

3. The apparatus of claim 1 wherein the energy capable of being absorbed by said first energy-absorbing unit is less than the energy capable of being absorbed by said second energy-absorbing unit.

4. The apparatus of claim 1 wherein said second energy-absorbing unit comprises a first carriage fixedly mounted with respect to said steering column, a second carriage fixedly mounted with respect to said stress-bearing structure, said first and second carriages being displaceably mounted with respect to each other, and a second energy-absorbing element for absorption of said energy upon displacement of said first carriage with respect to said second carriage.

5. The apparatus of claim 4 wherein said locking member comprises an electrically operated solenoid.

6. The apparatus of claim 5 wherein said electrically operated solenoid is mounted on one of said first and second carriages, said electrically operated solenoid including a piston, and wherein the other of said first and second carriages includes a recess cooperating with said piston.

7. The apparatus of claim 6 wherein said electrically operated solenoid is mounted on said second carriage and said other of said first and second carriages comprises said first carriage.

8. The apparatus of claim 4 wherein said second energy-absorbing element comprises a strip including a first end and a second end, said first end of said strip being affixed to said first carriage and said second end of said strip being affixed to said second carriage.

9. A method for protecting the occupant of a motor vehicle including a seatbelt for restraining said occupant, a stress-bearing structure, a steering shaft, and a steering column supporting said steering shaft, said steering column being displaceably mounted with respect to said stress-bearing structure, said method comprising detecting a condition in which said occupant is restrained by said seatbelt, absorbing energy through a first energy-absorbing unit upon displacement of said steering column with respect to said stress-bearing structure by said occupant, and absorbing energy through a second energy-absorbing unit upon displacement of said steering column with respect to said stress-bearing structure when said condition is detected.

10. The method of claim 9 including preventing absorption of said energy by said second energy-absorbing unit by displacement of said steering column with respect to said stress-bearing structure by said occupant when said condition is not detected.

11. The method of claim 9 wherein the energy capable of being absorbed by said first energy-absorbing unit is less than the energy capable of being absorbed by said second energy-absorbing unit.

12. The method of claim 10 wherein said second energy-absorbing unit includes a locking member having a first actuated condition for permitting said absorption of energy by said second energy-absorbing unit, and a second non-actuated condition for preventing said absorption of energy by said second energy-absorbing unit, whereby said locking member is actuated when said condition is detected, said method including feeding a current to an electrically operated solenoid for actuating said locking member.

13. The method of claim 9 wherein a second carriage is affixed to said stress-bearing structure, and a first carriage is affixed to said steering column, said first and second carriages being displaceably affixed to each other, said absorbing of said energy through said second energy-absorbing unit comprising displacement of said first carriage with respect to said second carriage.

* * * * *